UNITED STATES PATENT OFFICE.

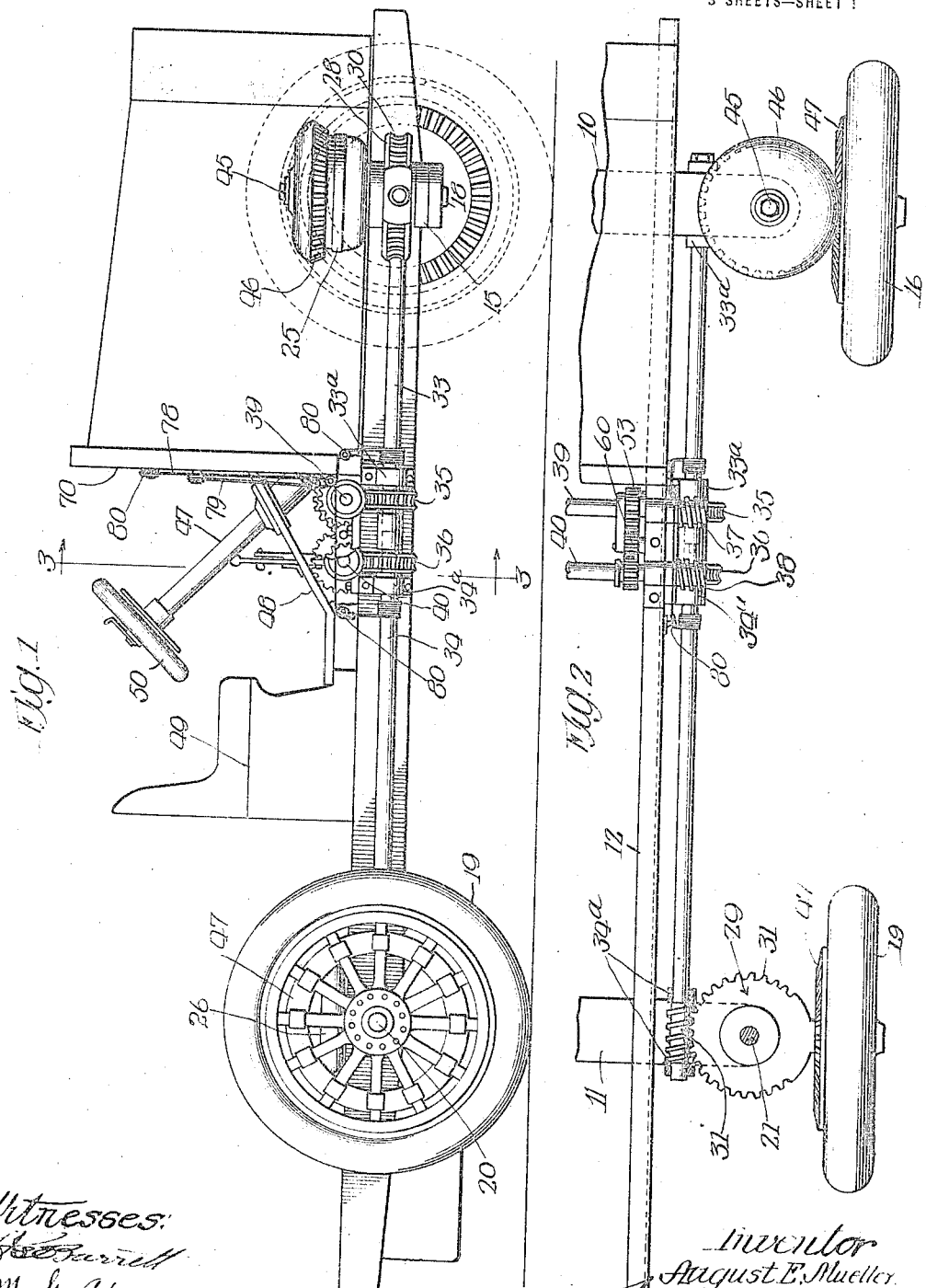

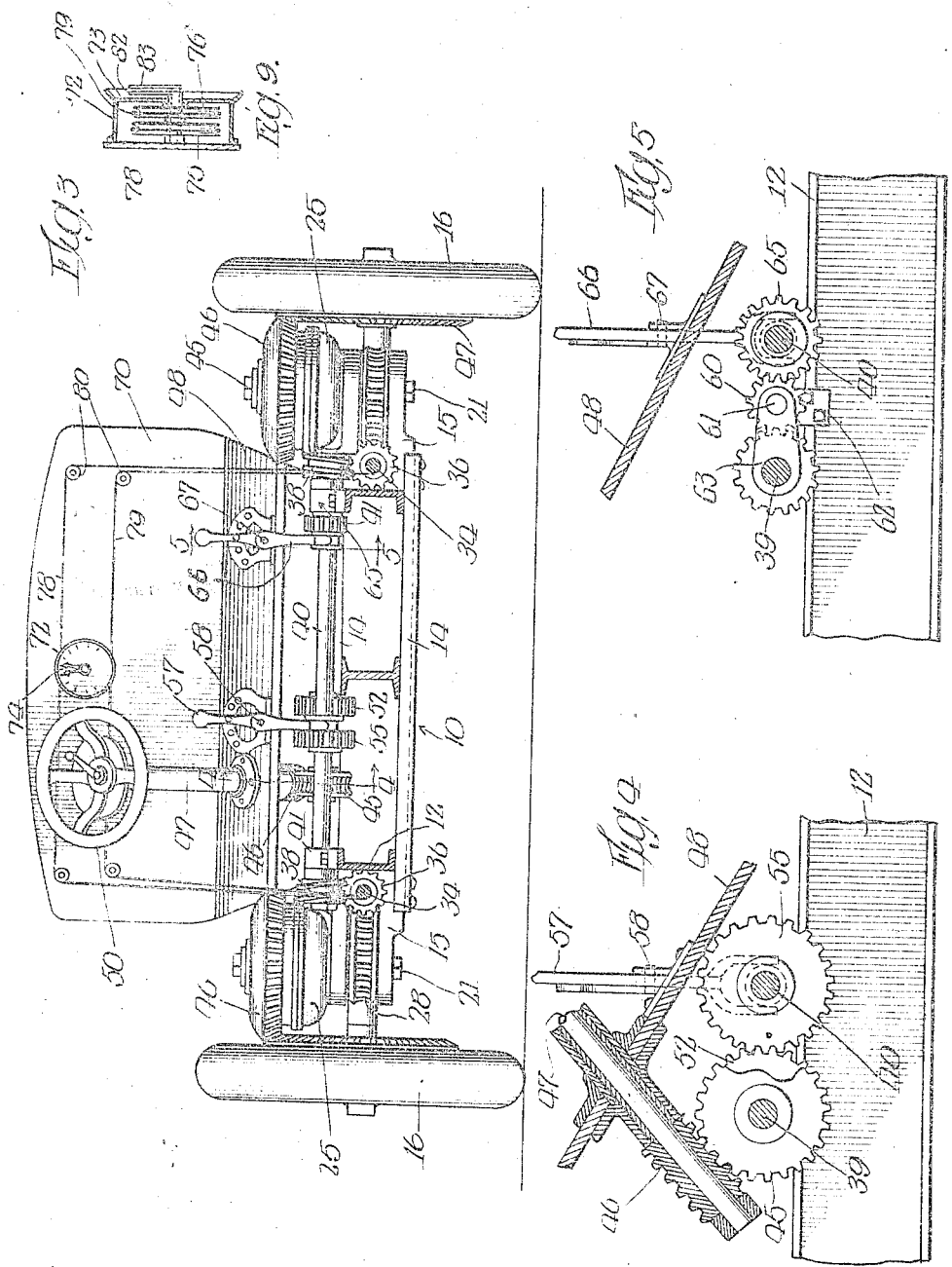

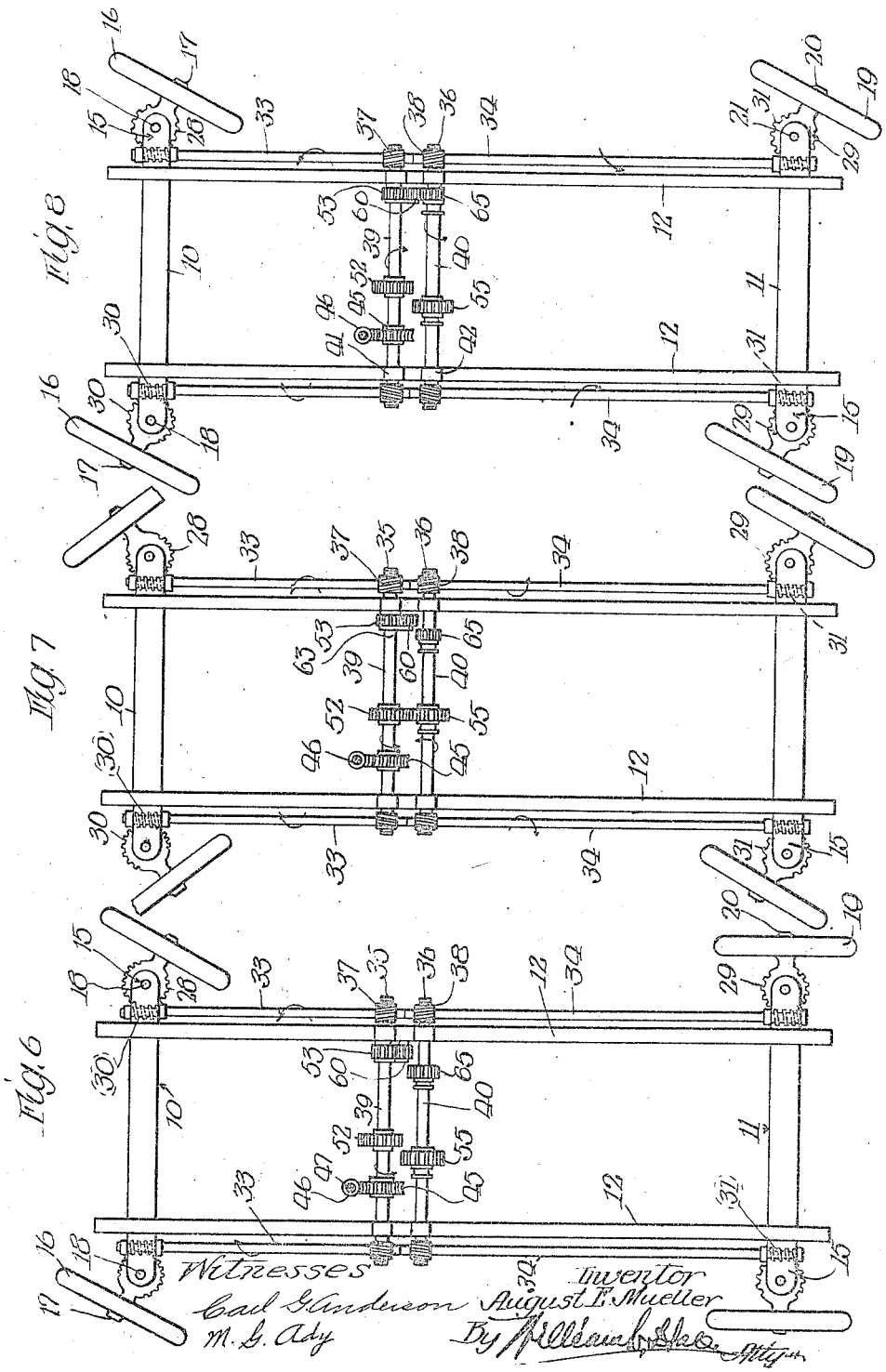

AUGUST E. MUELLER, OF CHICAGO, ILLINOIS, ASSIGNOR OF ONE-THIRD TO THOMAS J. HRUBY AND ONE-THIRD TO JOHN O. HRUBY, JR., BOTH OF CHICAGO, ILLINOIS.

STEERING-GEAR FOR MOTOR-VEHICLES.

1,255,775.    Specification of Letters Patent.    Patented Feb. 5, 1918.

Application filed July 1, 1916. Serial No. 107,014.

*To all whom it may concern:*

Be it known that I, AUGUST E. MUELLER, a citizen of Argentina, South America, and a resident of Chicago, in the county of Cook and State of Illinois, have invented certain new and useful Improvements in Steering-Gears for Motor-Vehicles; and I do hereby declare that the following is a full, clear, and exact description thereof, reference being had to the accompanying drawings, and to the characters of reference marked thereon, which form a part of this specification.

This invention relates to improvements in motor driven vehicles and refers more particularly to steering gear mechanism for such vehicles.

The steering gear constituting the present invention is designed more particularly for use in connection with vehicles in which power is applied to both the front and rear wheels for the purpose of driving the same, although it may be adapted to vehicles having other driving means. The improved steering gear, however, is adapted to a form of motor driven vehicle in which both the front and rear wheels are rotatively mounted on short swinging stub axles which are severally connected through proper gear connections to a steering post at the driver's seat.

Among the objects of the invention is to provide a steering gear of this general character by the use of which the stub axles on which the vehicle wheels are mounted may be swung on their pivots at various angles relatively to each other so as to adjust the wheels for steering movements of different kinds. For instance, if the rear wheels of the vehicle be located in their normal direct-drive positions, the front wheels may be steered in the usual manner by turning the two front wheels from side to side. In another adjustment of the steering gear, both the front and rear wheels are operatively connected to the steering post in such a way that the rear wheels are both turned in one direction from a straight line, and the front wheels are turned in the opposite direction from a straight line. With this adjustment of the steering gear, the vehicle may be made to turn in its own length about an axis located at the longitudinal center of the vehicle. In another adjustment of the gear, both the front and rear wheels are turned toward the same side from a straight line, in which adjustment the vehicle is caused to travel bodily sidewise.

I have herein shown a practical mechanism for applying my improvements to a practical motor car construction, and the same will be hereinafter specifically described. It will be understood, however, that the invention is not limited to the details shown, except as such details are hereafter made the subject of specific claims and as imposed by the prior art.

In the drawings:—

Figure 1 is a side elevation of a motor vehicle embodying my invention with one of the front wheels removed.

Fig. 2 is a plan view of one side of the vehicle.

Fig. 3 is a vertical section on the line 3—3 of Fig. 1, looking forwardly.

Figs. 4 and 5 are detail sections on lines 4—4 and 5—5, respectively, of Fig. 3.

Figs. 6, 7 and 8 are diagrams illustrating the manner of adjusting the gear mechanism for three different steering adjustments.

Fig. 9 is a sectional detail of an indicator for indicating the angles of divergence of the steering wheels from a direct line.

The motor vehicle herein shown is constructed generally like that illustrated in my co-pending application for United States Letters Patent Serial No. 110,642 filed on the 22nd day of July, 1916,—in that there is provided an independent motor to drive each wheel of the vehicle, all of said wheels being rotatively mounted on swinging stub axles connected to the steering gear.

As shown in said drawings, 10, 11 designate, respectively, the front and rear axle frames of the vehicles, and 12, 12 designate the side members of the chassis. The said axle frames, as herein shown, comprise upper and lower channel plates 14, 14, between which the side members 12 of the chassis extend and to which they are bolted or otherwise attached, and end castings 15, 15 rigidly fixed to said channel plates. So far as the detail of construction of the axle frame is concerned, however, the same may be otherwise constructed.

The front wheels 16, 16 are mounted on stub shafts 17, 17, which latter are pivoted by means of upright pivots 18 to the end castings 15 of the axle frame. The rear wheels 19, 19 are likewise mounted on swinging stub shafts 20 which are pivoted by means of upright pivots 21 to the end castings 15 of the rear axle frames 11. 25, 26 designate, respectively, front and rear motors for driving the front and rear wheels, one motor being herein shown as supported at each wheel on the end axle casting 15 and disposed concentrically with respect to the pivot of the associated stub shaft. The motor herein shown is a steam engine of that type shown in my pending application for United States Letters Patent Serial No. 103,271, filed June 12, 1916. Inasmuch, however, as the construction and operation of the motors constitute in themselves no part of the present invention, the details thereof are omitted from the present drawings.

The said front and rear stub shafts 17, 20, respectively, are formed at their inner ends to provide disks 28, 29, respectively, which are provided with a curved series of worm teeth 30, 31 which are disposed concentrically with respect to the swinging axes 18, 21, respectively, of the stub shafts. The end castings 15 of the axle frames are bifurcated to provide horizontal spaces to receive the worm disks 28, 29, in the manner best shown in Figs. 1 and 3. It will be noted at this point that the pivots for the front and rear stub shafts are in line with the engine shafts 45, to which are attached beveled gear wheels 46 located above the engines that mesh with annular beveled gear teeth 47 carried by the vehicle wheels.

The worm teeth of the front and rear stub shaft disks mesh with worms 30, 31 which are carried by the front and rear ends, respectively, of horizontal shafts 33, 34 which extend longitudinally of the chassis and are herein shown as arranged at the outer sides of the longitudinal members 12 of the chassis. Said shafts 33, 34 are mounted in suitable bearings 33ª, 34ª, respectively, carried by and rigid with the chassis. The said shafts 33, 34 at each side of the vehicle are in line with each other and are provided at their meeting ends with worm wheels 35, 36, respectively, which mesh with worms 37, 38, that are respectively mounted on the ends of horizontal transverse shafts 39, 40, which extend across the chassis of the vehicle and are rotatively mounted in suitable bearings 41, 42. The front transverse shaft 39 is provided with a worm wheel 45 which meshes with a worm 46 carried by the lower end of a steering post 47 which extends downwardly and forwardly through the usual foot-board 48, and is provided at its upper end adjacent to the seat 49 with the usual steering wheel 50. The front transverse shaft 39 is also provided adjacent to the worm wheel with a spur gear 52, and is provided near the right side member of the chassis frame with a second spur gear 53,—both said gears 52, 53 being non-rotatively fixed to said shaft. The rear transverse shaft 40 is provided with a spur gear 55 which is splined on said shaft so as to be movable into and out of mesh with the spur gear 52. The hub of said gear 55 is connected to a shipping lever 57 which extends upwardly through the foot-board and is pivoted at 58 thereto in convenient access to the driver's seat.

The spur gear 53 of the front transverse shaft 39 is in constant mesh with an idler gear 60 which is rotatively mounted on a shaft 61 that is carried by a fitting 62 which is attached in any suitable manner to the adjacent side member of the chassis. Said idler gear shaft 61 may also be connected by a link 63 to the rear transverse shaft 40. Said rear transverse shaft carries a second sliding spur gear 65 that is adapted to be shifted into and out of mesh with the idler gear 60, the sliding movement of said gear 65 being controlled by a shipping lever 66 that extends through the foot-board and is pivoted at 67 thereto adjacent to the steering post.

The operation of steering the vehicle by the steering gear described is as follows:

First, assuming that the vehicle is to be steered by the front wheels only, the adjustment for which is illustrated in Fig. 6, the sliding spur gears 55 and 65 are shifted out of mesh with their mating gears 52 and 60, respectively. With this adjustment the rear wheels are disconnected from the steering post 47 and the worms on the rear longitudinal shafts 34, 34 serve to lock the rear wheels in position for straight travel. The front wheels are swung from side to side through the action of the gear connected steering post, the front transverse shaft 39 and the side longitudinal shafts 33.

If it be desired to adjust the steering gear to turn the vehicle in its own length or about an axis located between the ends of the vehicle, the spur gear 55 is shifted into mesh with the gear 52. By reason of the direct drive connection between the steering post actuated shaft 39 and the shaft 40 and of the worm gear connections between the shafts 39 and 40 and the shafts 33 and 34, respectively, the shafts 34 will be turned or rotated in a direction opposite to the rotation of the shafts 33, with the result that the front wheels will be turned to one side of the line of straight travel of the vehicle, and the rear wheels will be turned toward the opposite side of said line in a manner clearly shown in Fig. 7. This mode of steering the vehicle is especially advantageous when the vehicle is used as an agricultural tractor for drawing plows and other land-cultivating implements, inasmuch as it permits the vehicles to be turned in a small place, as around the corners of "lands" in plowing.

If it be desired to manipulate the steering gear to direct the vehicle bodily laterally from a straight line of travel, the spur gear 55 is shifted to release it from the spur gear 52, and the spur gear 65 is shifted to bring it into engagement with the idler spur gear 60. With this adjustment of the parts, as shown in Fig. 8, both front and rear wheels are simultaneously swung toward the same side of the straight line of travel, so that when power is applied to drive the vehicle, the vehicle moves forwardly and laterally in directions determined by the angle which the wheels assume to a straight line of travel. This adjustment of the steering gear is especially useful when it is desired to drive a motor-driven truck to a landing position in close quarters alongside a curb, as where the loading space is short, or where it is desired to move a vehicle that is standing alongside a street curb with other vehicles closely adjacent to the rear and front end thereof.

It will be noted that the construction of the steering gear described is such as to positively and promptly move the steering wheels which it is desired to manipulate, and to hold or lock them from movement except when actuated through the steering post.

In connection with the gear described, I have provided a gage, which may be located at the dashboard 70, which is so connected to the shafts 33 and 34 as to indicate the angles of both the front and rear wheels without the necessity of observing the wheels. As herein shown, said gage or indicator consists of a casing 72 having a dial 73 marked in graduations of degrees from a center or zero point 74. Mounted in any suitable manner in said casing for independent rotation are two drums 75, 76 about which are wrapped the intermediate portions of cables 78, 79. Said cables are trained over suitably located and supported guide pulleys 80 and the cable 78 is wound at its ends about the forward longitudinal shafts 33 of the steering gear, while the other cable 79 is wound at its ends about the rear longitudinal shafts 34. Said drums are provided with hands 82, 83 which sweep over the dial.

The construction and arrangement of the indicator is such that when both front and rear wheels are adjusted straight ahead for direct travel, the indicator hands are both directed to the zero point of the dial. If either the front or rear wheels be diverted from a direct line, the connection of the controlling shafts (33, 34) through the cables (78, 79) with the hands of indicator indicates such divergence and the angle thereof. Said indicator is especially useful when changing the gear from both front and rear wheel steering to a front wheel steering, inasmuch as in the latter adjustment, shown in Fig. 6, it is essential that the rear wheels shall be adjusted to a straight or direct line of travel. The rear wheels may be thus straightened for direct travel when the gear is in either of the adjustments shown in Figs. 7 and 8, and after the indicator registers straight adjustment for the front and rear wheels the rear horizontal shaft 40 is disconnected from the front horizontal shaft 39 through the shifting of that one of the gears 55, 65 theretofore in the operative gear train for giving steering movement to the rear wheels. Thereafter the vehicle is steered through the front wheels in the usual manner.

I claim:—

1. A steering gear for motor driven vehicles comprising, in combination with the chassis, front and rear steering wheels; a steering post; a transverse shaft geared to said post and operatively connected to the front steering wheels; a second transverse shaft operatively connected to the rear steering wheels, and gears for connecting said transverse shafts.

2. A steering gear for motor driven vehicles comprising, in combination with the chassis; front and rear steering wheels; a steering post; a transverse shaft geared to said post and operatively connected to the front steering wheels; a second transverse shaft operatively connected to the rear steering wheels; and driving and reversing gears on said transverse shafts.

3. A steering gear for motor driven vehicles comprising, in combination with the chassis, stub shafts pivoted thereto for the vehicle wheels; front and rear, longitudinally-arranged, separately-rotatable shafts at the sides of the chassis; worm gear connections between the ends of said shafts and said stub shafts; a steering post and gearing between the steering post and said longitudinal shafts.

4. A steering gear for motor driven vehicles comprising, in combination with the chassis; stub shafts pivoted thereto for the vehicle wheels; front and rear, longitudinally-arranged, separately-rotatable shafts at the sides of the chassis; worm gear connections between the ends of said shafts and said stub shafts; front and rear transverse shafts, one geared to the front longitudinal shafts and the other geared to the rear longitudinal shafts; a steering post geared to the front transverse shaft and gear connections between said transverse shafts.

5. A steering gear for motor driven vehicles comprising, in combination with the chassis; stub shafts pivoted thereto for the vehicle wheels; front and rear, longitudinally-arranged, separately-rotatable shafts at the sides of the chassis; worm gear connections between the ends of said shafts and said stub shafts; front and rear transverse shafts, one geared to the front longitudinal shafts and the other geared to the rear longitudinal shafts; a steering post geared to the front transverse shaft, and shiftable gear connections between said transverse shafts constructed to separately rotate the rear transverse shaft in opposite directions.

6. A steering gear for motor driven vehicles comprising, in combination with the chassis; stub shafts pivoted thereto for the vehicle wheels; front and rear, longitudinally-arranged, separately-rotatable shafts at the sides of the chassis; worm gear connections between the ends of said shafts and said stub shafts; front and rear transverse shafts; worm gear connections between the rear transverse shaft and the forward ends of the rear longitudinal shafts; worm gear connections between the ends of the forward transverse shaft and the rear ends of the forward longitudinal shafts; a steering post geared to the forward transverse shaft; a gear fixed on the forward transverse shaft; a sliding gear on the rear transverse shaft adapted to be shifted into mesh with the former gear; a second gear fixed to the forward transverse shaft; an idler gear meshing therewith and a second sliding gear on the rear transverse shaft adapted to be shifted into and out of mesh with said idler gear.

7. A steering gear for motor driven vehicles comprising, in combination with a chassis consisting of longitudinal, and front and rear transverse axle, members; horizontal stub shafts pivoted to said axle members embracing inner worm gear disks; wheels rotatively mounted on said shafts; front and rear pairs of longitudinal shafts at the sides of the chassis having worms which mesh with said worm gear disks, and a steering post operatively connected to the meeting ends of said longitudinal shafts.

8. A steering gear for motor driven vehicles comprising, in combination with a chassis consisting of longitudinal, and front and rear transverse axle, members; horizontal stub shafts pivoted to said axle members embracing inner worm gear disks; wheels rotatively mounted on said shafts; front and rear pairs of longitudinal shafts at the sides of the chassis having worms which mesh with said worm gear disks, and a steering post with worm gear mechanism operatively connected to the meeting ends of said longitudinal shafts.

9. A steering gear for motor driven vehicles comprising, in combination with the chassis having front and rear steering wheels; a steering post; operative connections between said post and the front and rear wheels to swing said wheels in unison for front and rear steering, and to swing the front wheels for front steering, and an indicator connected separately to and indicating the angular positions of the front and rear steering wheels.

10. A steering gear for motor driven vehicles comprising, in combination with the chassis; front and rear steering wheels; front and rear, longitudinally-arranged, separately-rotatable shafts at the sides of the frame; gear connections between the ends of said shafts and the steering wheel shafts; a steering post; operative connections between the steering post and said longitudinal shafts, and an indicator connected to said shafts.

In testimony whereof, I have hereunto set my hand, at Chicago, Illinois, this 26th day of June, 1916.

AUGUST E. MUELLER.

Witnesses:
W. L. HALL,
M. G. ADY.